United States Patent

Miller

[11] 4,051,336

[45] Sept. 27, 1977

[54] PRESSURE SENSITIVE DOOR EDGE SWITCH AND ACTUATOR CONSTRUCTION

[75] Inventor: Norman K. Miller, Concordville, Pa.

[73] Assignee: Miller Brothers, Concordville, Pa.

[21] Appl. No.: 681,430

[22] Filed: Apr. 29, 1976

[51] Int. Cl.² .................. H01H 3/16; E05F 15/02
[52] U.S. Cl. ...................... 200/61.43; 49/27
[58] Field of Search ............ 200/61.43, 86 R; 318/266; 49/27

[56] References Cited

U.S. PATENT DOCUMENTS

| 3,056,628 | 10/1962 | Golde | 200/61.43 X |
|---|---|---|---|
| 3,118,984 | 1/1964 | Koenig | 200/61.43 |
| 3,544,746 | 12/1970 | Wolf et al. | 200/86 R |
| 3,986,577 | 10/1976 | Ebbesson et al. | 200/61.43 X |

*Primary Examiner*—James R. Scott
*Attorney, Agent, or Firm*—Robert K. Youtie

[57] ABSTRACT

A pressure sensitive door edge construction including a channel facing outwardly from a door and having inturned lips defining therebetween a slot, a resiliently depressible bead extending exteriorly along the channel bridging the slot, a reduced neck on the inner side of the bead extending through the slot, and inner enlargement on the neck interiorly of the channel, and pressure responsive means operatively connected to the bead for stopping door movement upon bead depression.

10 Claims, 8 Drawing Figures

PRESSURE SENSITIVE DOOR EDGE SWITCH AND ACTUATOR CONSTRUCTION

BACKGROUND OF THE INVENTION

While there have, in the past, been provided a variety of pressure sensitive door edge constructions, prior devices of this type were subject to expensive and dangerous damage from vandalism, and presented manufacturing difficulties in meeting widely varying environmental and performance specifications.

SUMMARY OF THE INVENTION

It is, therefore, an important object of the present invention to provide a unique pressure sensitive door edge construction which, in one embodiment, is extremely resistant to damage, even by vandalism, and will continue to function notwithstanding substantial mutilation.

It is another object of the present invention to provide a pressure sensitive door edge construction, which is uniquely adaptable to meet a wide range of structural and functional requirements and specifications by relatively simple and inexpensive changes.

While the door edge construction of the present invention has been primarily developed for use in train doors, and the like, and will be illustrated and described hereinafter with particular reference thereto, it is appreciated that the device of the instant invention is equally applicable for use in personnel elevator doors, automatic vehicle windows, and a wide variety of other applications, all of which are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described and of which the scope will be indicated by the appended claims.

DESCRIPTION OF THE PREFERRED EMBODIMENTS

Figure 1:
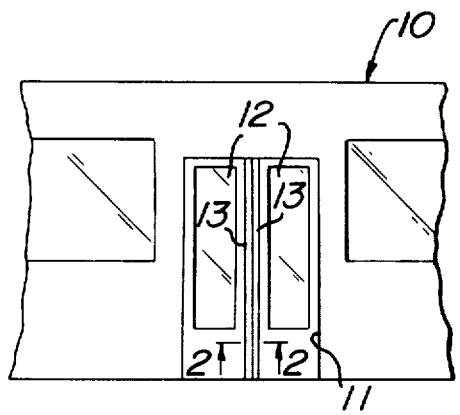
FIG. 1 is a partial elevational view of a train, showing personnel doors incorporating the pressure responsive door edge construction of the present invention.
Figure 2:
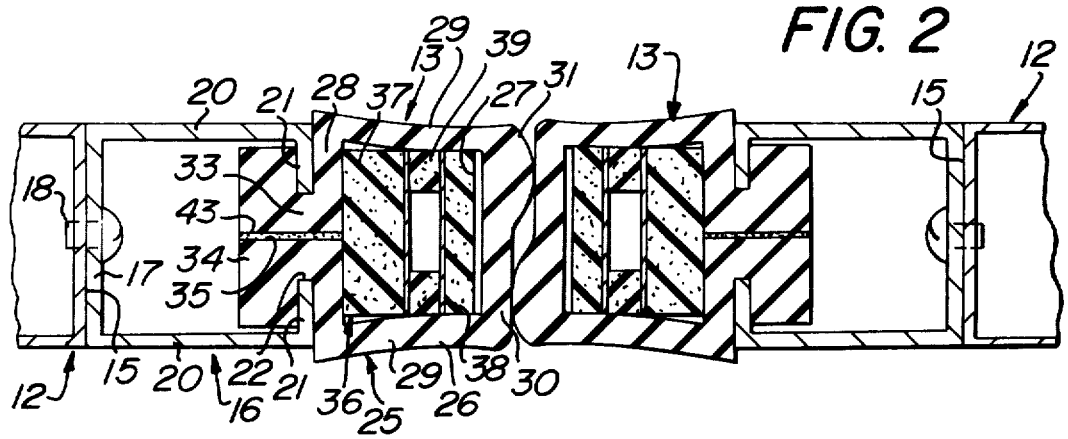
FIG. 2 is a partial horizontal sectional view taken generally along the line 2—2 of FIG. 1, enlarged for clarity of understanding.
Figure 3:
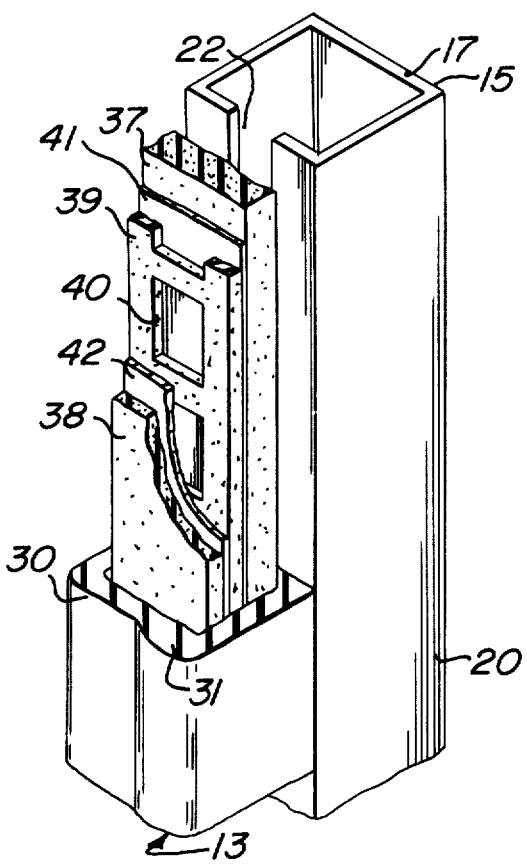
FIG. 3 is a partial perspective view showing a door edge construction of FIG. 2, broken away to facilitate understanding.

Referring now more particularly to the drawings, and specifically to FIGS. 1-3 thereof, there is shown in FIG. 1 a train car 10, say of the modern commuter style train having a doorway 11 provided with a pair of sliding doors 12. The doors 12 each include a safety edge 13 constructed in accordance with the teachings of the present invention. While the safety edge to be described is shown herein as applied to train doors, it is appreciated that the instant safety edge may find equally advantageous employment in various personnel passage doors, including elevators and others, as well as for use on windows, say in motor vehicles, and in other applications, say as door opening push members, and the like; all of which are intended to be comprehended herein.

In FIG. 2 is shown in greater detail the pair of safety edges 13 of doors 12. The safety edges 13 may be identical, so that a detailed description of one will suffice. Secured along the outer or closing edge 15 of each door 12, longitudinally coextensive therewith, is an elongate receiver or channel 16. The channel may include a back or bottom wall 17 secured fast in facing engagement with the outer edge 15 of the door 12 by any suitable fastener means, such as screws 18. A pair of generally parallel, spaced channel side walls 20 extend generally normal to and outwardly from opposite side edges of the back or inner wall 17, and are provided on their outer edges with longitudinally coextensive, inturned lips or flanges 21. The lips or flanges 21 are generally coplanar, extending inwardly toward and terminating short of each other to define in the space therebetween a longitudinally extending opening or slot 22.

The door edge 13 further includes an elongate, unitary body 25 fabricated of resiliently yieldable material, such as rubber or plastic, say polyvinyl chloride. The body 25 includes an elongate bead 26 extending longitudinally along the outer side of channel 16, adjacent to the outer surfaces of lips or flanges 21, overlying the latter and bridging the interlip space or slot 22. The bead 26 is internally hollow, as at 27 and may be of generally polygonal configuration, including an inner or back wall 28 in facing relation with the outer faces of flanges 21, a pair of longitudinally extending, generally parallel side walls 29 outstanding from opposite side edges of back wall 28, and an outer wall 30 extending laterally between the outer edges of side walls 29 and longitudinally coextensive with the back and side walls 28 and 29. An engagement rib 31 may be provided exteriorly on the outer wall 30 for interfitting or weather stripping engagement with a like door edge, jamb, or other abutment surface.

Longitudinally coextensive with the inner or back bead wall 28, projecting from a laterally intermediate region thereof is an integral, reduced portion or neck 33 extending generally conformably through the channel opening or slot 22. The reduced portion or neck 33 is provided interiorly of the channel 16 with a longitudinally extending T-portion or enlargement 34 configured for retaining engagement with the inner surfaces of channel lips 21.

Thus, as will be apparent from the drawings, the unitary body 25 of bead 26, neck 33 and enlargement 34, integrally fabricated or rubber, or the like, is readily adapted for assembly with the channel 16 by endwise insertion of the integral body with neck 33 entering into slot 22, enlargment 34 interiorly of the channel and bead 26 exteriorly of the channel.

In manufacture, the body 25 may be extruded, as being of constant cross-section throughout its length, and may be provided with a longitudinal slit, opening or passageway 35 communicating laterally medially through enlargement 34 and neck 33. Prior to assembly of the body 25 with channel 16, the body may be resiliently deflected to open or distend the slit 35, and enable passage therethrough of pressure responsive switch means 36 into the interior hollow 27 of the bead 26, after which the slit 35 may be sealed, as by sealing means 43 and the ends of body 25 also suitably sealed to the atmosphere. If desired, the switch means 36 may further be encompassed in an envelope of flexible, impervious sheet material for additional sealing.

The illustrated pressure responsive switch means 36 may be of the type illustrated in U.S. Pat. No. 3,855,733 to Miller, or may be other suitable pressure responsive switch means, including hydraulic, pneumatic, or other. However, as illustrated, the switch means 36 includes inner and outer resiliently compressible strips 37 and 38, say of plastic foam, or the like, and an intermediate resiliently compressible strip 39 between the inner and outer strips and having spaced therealong through openings 40. Sandwiched between the intermediate strip 39 and each of the strips 37 and 38 are respective flexible conductive strips 41 and 42, being spaced apart by the intermediate strip 39 and in facing spaced relation through the openings 40. Upon compressive deflection of the bead 25, the conductive strips 41 and 42 are moved into contact and close an electric circuit to effect door operation. Such an operating circuit may be of the type shown in prior U.S. Pat. No. 3,754,176 to Miller, or other suitable closure operating means. Of course, electrical leads are taken from the switch means 36 through the body 25 without adversely affecting the hermetic seal thereof, which leads may be for pneumatic, hydraulic or other suitable pressure responsive and operating means, as desired.

It will now be appreciated that the door edge 13 is adapted to provide a highly effective safety edge. By its construction the bead 26 simulates a normal door edge cushion, so that its safety operation aspect is concealed from the general public. The degree of sensitivity may be very conveniently varied to achieve almost any desired sensitivity within a very wide range by merely selecting the desired durometer of the unitary body 25. One measure of safety edge sensitivity is the pounds per square inch necessary to effect operation. The desired sensitivity might be quite different, say between subway doors and warehouse doors. While the sensitivity may be varied by other means, say altering the dimensions of the switch means 36, or of the bead walls, it is simpler and more economical to merely extrude material of a desired hardness or durometer. Of course, if desired, any possible shifting of the body 25 relative to the channel 16 may be precluded, as by passing fasteners through the channel side walls 20 into the enlarged part 34.

Figure 4:
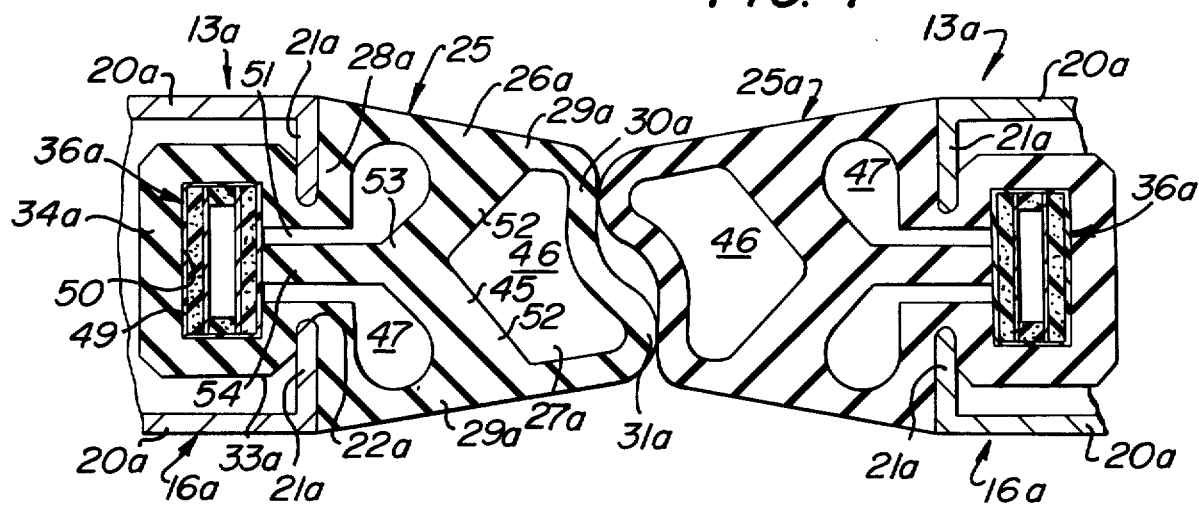
FIG. 4 is a horizontal sectional view similar to FIG. 2, but showing a slightly modified embodiment.
Figure 5:
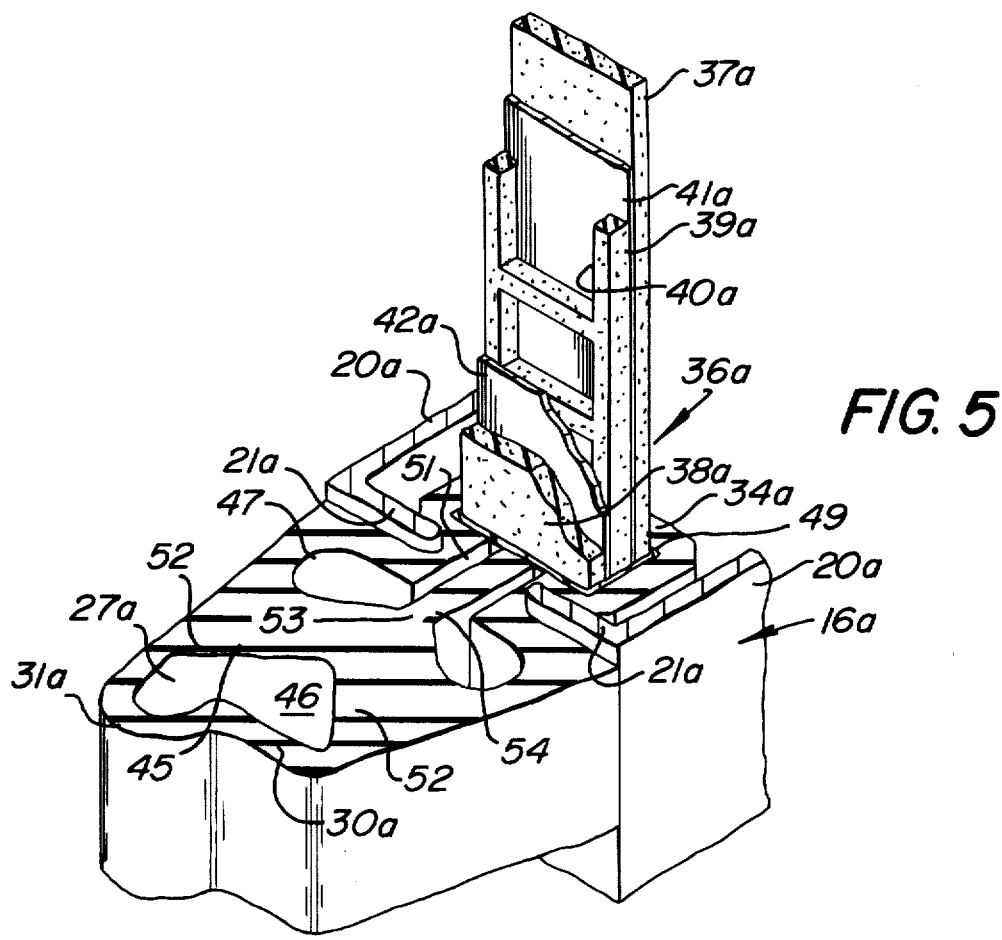
FIG. 5 is a partial perspective view of the embodiment of FIG. 4, broken away for ease of understanding.

Considering now the embodiment of FIGS. 4 and 5, there is shown therein a safety edge, generally designated 13a including a channel 16a which may be substantially identical to the channel of the first described embodiment, including parallel spaced side walls 20a, and inturned lips or flanges 21a. The interlip space defines a slot 22a, similar to the slot 22 of the first described embodiment.

Additionally, there is provided a resiliently deflectable integral body 25a, corresponding to the body 25, but of modified structure. The body 25a includes a bead 26a extending longitudinally along and on the other side of lips 21a, bridging the slot 22a. The bead 26a may include a back wall 28a extending along and in facing engagement with the outer sides of channel lips 21a, a pair of laterally spaced side walls 29a extending longitudinally along and outstanding from opposite side edges of back wall 28a, and an outer or engaging wall 30a extending longitudinally of and laterally between the forward edges of side walls 29a. The outer or front wall 30a may be provided longitudinally therealong with an outstanding rib 31a, as for weathertight engagement with a door jamb, mating door, or the like.

The interior of bead 26a may be hollow, as at 27a, and may be provided with an internal wall 45 extending laterally across the internal hollow between intermediate regions of the side walls 29a. That is, the internal wall or partition 45, which may be formed integrally with the bead side walls 29a, spaced between the bead back wall 28a and outer wall 30a, may extend laterally across the bead interior, subdividing the same into an outer interior hollow 46 and an inner interior hollow 47.

Extending integrally from the bead 26a generally conformably through the channel slot 22a is a reduced portion or neck 33a, generally longitudinally coextensive with the bead. Integral with the neck 33a, interiorly of the channel 16a, is an enlargement 34a, which is in facing engagement with the inner faces of both inturned lips or flanges 21a to retain the body 25a in assembly with the channel 16a. The enlargement 34a is advantageously interiorly hollow, as at 50, and the interior hollow 50 of the enlargement 34a may communicate through the neck 33a by an opening or passageway 51, with the interior hollow 27a of the bead 26a. Particularly, the interior hollow 50 of the enlargement 34a communicates through neck passageway 51 with the interior hollow region 47 inwardly of the internal wall 45. Located within the interior hollow 50 of the enlargement 34a, which latter is within the channel 16a, is pressure responsive actuating means 36a. The actuating or switch means 36a is illustrated as similar to the actuating or switch means 36, but is provided with an envelope 49 of impervious material sealing the switch means from the atmosphere. Other suitable pressure responsive actuating means, such as hydraulic or pneumatic, may be employed, if desired, and the pressure responsive means is suitably connected in actuating relation with operating means, as described in the embodiment of FIGS. 1–3.

The internal bead wall or partition 45 may be of angulate or nonstraight configuration, say being V-shaped in cross-section including wall portions 52 converging toward each other from respective bead side walls 29a inwardly toward inner bead wall 28a and merging at a juncture or apex 53 proximate to the neck passageway 51. Thus, the internal bead wall 45 is bowed or angulated away from the front or outer bead wall 30a and toward the inner or back bead wall 28a. Projecting from the crown or apex 53 of internal bead wall 45, longitudinally coextensive with the body 25a, is a pressure transmitting rib or lip 54. The pressure transmission rib or projection 54 is an integral formation of the body 25a, and extends in spaced relation through the neck passageway 51 for edge abutting engagement with the pressure responsive switch means 36a. Thus, it will be appreciated that the entire body 25a, as in the first described embodiment, may be integrally fabricated from resiliently deflectable material, such as rubber or suitable plastic, as by extrusion, molding, or otherwise.

In use, inward deflection of the bead 29a, as by pressure against outer wall 30a or angulate pressure against side walls 29a, will effect inward movement of projection or rib 54 through passageway 51 against pressure responsive switch means 36a to compress the latter and effect circuit closure or other switch means operation.

By the embodiment of FIGS. 4 and 5, there are achieved substantially all the advantageous characteristics mentioned in connection with the first described embodiment of FIGS. 1–3, including the highly selective pressure responsive sensitivity by durometer control of the body 26a, and further advantageous results in extreme resistance to the most deliberate destructive abuse or flagrant vandalism, as by severance or impaling with a sharp instrument or knife. It will now be appreciated that even cutting of the edge 13a down to the channel 16a would not prevent operation of the door, no matter where such cutting occurred. Thus, vandal resistant operation is substantially completely assured, unless the vandals were intimately knowledgeable about the safety edge construction.

While the integral body 26a may be split, as at the enlargement 34a, for receiving the pressure responsive switch means 36a, the switch means may also be inserted endwise longitudinally into the enlargement hollow 50, without the need for subsequent sealing. Also, the assembly of body 26a and switch means 36a may be assembled with the channel 16a by endwise insertion in the latter, it being preferred that the opposite ends of the body by suitably sealed prior to assembly.

Figure 6:
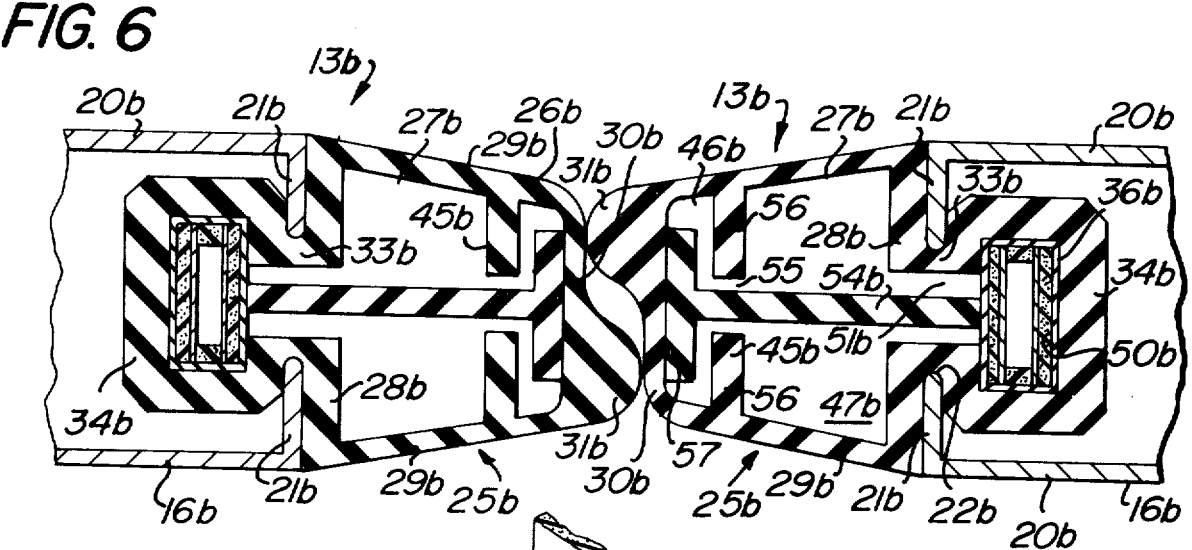
FIG. 6 is a horizontal sectional view similar to FIGS. 2 and 4, but showing another slightly modified embodiment of the present invention.
Figure 7:
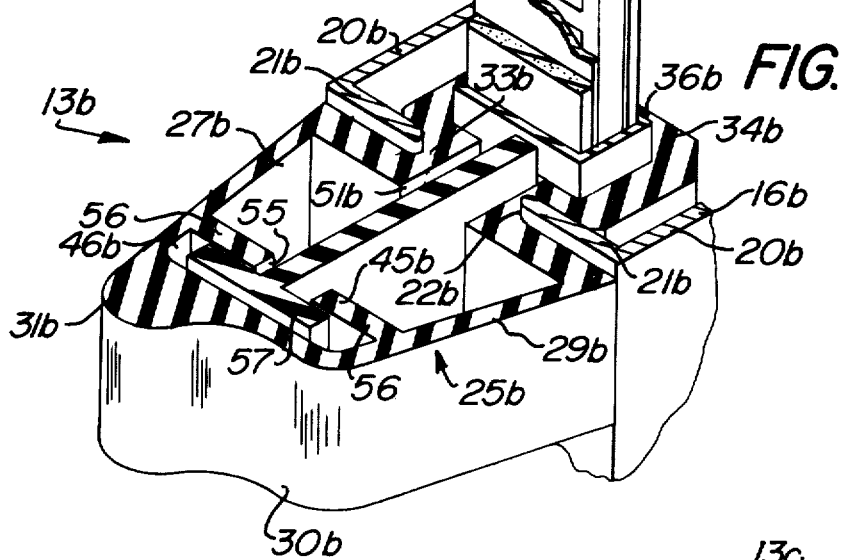
FIG. 7 is a partial perspective view of the embodiment of FIG. 6, broken away for clarity.

Referring now to the embodiment shown in FIGS. 6 and 7, a safety edge is there generally designated 13b, including a channel 16b which may be substantially identical to the channel of the hereinbefore described embodiments, including parallel spaced side walls 20b and inturned lips or flanges 21b. The interlip space defines a slot 22b which may be similar to the slots 22 and 22a of the hereinbefore described embodiments.

Additionally, there is provided a resiliently deflectable integral body 25b, but slightly modified, including a bead 26b extending longitudinally along and on the outer side of lips 21b, so as to bridge the slot 22b. The bead 26b may include a back wall 28b extending along and in facing engagement with the outer sides of the channel lips 21b, a pair of laterally spaced side walls 29b extending longitudinally along and outstanding from opposite side edges of the back wall 28b, and an outer or engaging wall 30b extending longitudinally of and laterally between the forward edges of side walls 29b. The outer of front wall 30b may be provided longitudinally therealong with an outstanding rib 31b, as for weathertight engagement with a door jamb, mating door edge, or the like.

The interior of bead 26b may be hollow, as at 27b, and may be provided with a split internal wall or partition 45b extending laterally across the internal hollow 27b between intermediate regions of the side walls 29b. The internal wall or partition 45b may be formed integrally with the bead side walls 29b, being spaced between the bead back wall 28b and outer wall 30b and may extend laterally across the bead interior to subdivide the same between an outer interior hollow 46b and an inner interior hollow 47b. Further, the internal wall or partition 45b is longitudinally split or open, as at 55 so as to subdivide the wall or partition into a pair of laterally inwardly extending shoulders 56, each of which extend laterally inwardly from a respective bead side wall 29b toward and terminate short of each other on opposite sides of the space or slot 55.

Extending integrally from the bead 26b generally conformably through the channel slot 22b is a reduced portion or neck 33b, generally longitudinally coextensive with the bead. Integral with the neck 33b, interiorly of the channel 16b, is an enlargement 34b, which is in facing engagement with the inner faces of both inturned lips or flanges 21b to retain the body 25b in assembly with the channel 26b. The enlargement 34b is advantageously interiorly hollow, as at 50b, and the interior of hollow 50b of the enlargement 34b may communicate through the neck 33b by an opening or passageway 51b, with the interior of hollow 27b of the bead 26b. Located within the interior hollow 50b of the enlargement 34b, which latter is within the channel 16b, is pressure responsive actuating means 36b. The actuating or switch means 36b is illustrated as similar to the actuating or switch means 36 and 36a, but other suitable pressure responsive actuating means may be employed, such as hydraulic or pneumatic, as in the hereinbefore described embodiments.

Extending longitudinally within the boddy 25b, longitudinally coextensive therewith, may be a resiliently flexible rib, projection, lip or tongue 54b. That is, the rib or tongue 54b extends longitudinally along and spacedly through the opening 51b in neck 33b, having the adjacent longitudinal edge proximate to switch means 36b. The other or outer longitudinal edge passes spacedly through the space or opening 55 between shoulders or flanges 56 of partition or wall 45b and extends outwardly into outer hollow region or chamber 46b. Provided on the longitudinally outer edge of lip or rib 54b, within hollow region or chamber 46b is an enlargement or cross member 57 of a lateral dimension greater than the lateral dimension of slot or opening 55, so as to be retained in hollow region 46b by shoulders 56.

Thus, as best seen in FIG. 6, the transverse extent of tongue or lip 54b is such as to just about engage switch means 36b when enlargement or cross-piece 57 engages outer bead wall 30b and the bead is in a relaxed or undepressed condition. Hence, upon depression of the bead 26b, such depression will be transmitted through lip or tongue 54b to switch means 36b for actuation by the latter of suitable operating means; and, upon return of the bead from its depressed condition the shoulders 56 will be in retaining engagement with the enlargement or cross-piece 57 to retract the tongue from its switch actuating relation.

If desired, the enlargement or cross-piece 57 may be cemented, or otherwise adhesively secured to the outer wall 30b, but this is not generally necessary. The operating advantages set forth in connection with the hereinbefore described embodiments are achieved in the embodiment of FIGS. 6 and 7, with a simpler extrusion body.

Figure 8:
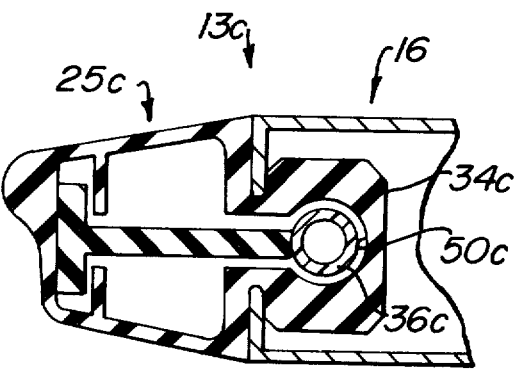
FIG. 8 is a horizontal sectional view similar to FIG. 6, but showing another slightly modified embodiment.

In FIG. 8 is shown a further slightly modified embodiment which may be essentially identical to the embodiment of FIGS. 6 and 7, including a safety edge generally designated 13c constituted of a channel 16c and extruded body 25c. The body 25c may be essentially identical to the body 25b, except that the inner enlargement 34c is provided with a generally cylindrical interior hollow 50c adapted to receive a hydraulic or pneumatic tube 36c as switch means, rather than the hereinbefore described electric switch means.

From the foregoing, it is seen that the present invention provides a pressure sensitive door edge construction which is capable of meeting a wide variety of required operating specifications, effectively resisting damage even by vandals, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A pressure sensitive door edge construction comprising a rigid channel for extension along a door facing outwardly therefrom, inturned lips on said channel spaced apart to define therebetween a longitudinal slot communicating between the interior and exterior of said channel, a resiliently depressible bead extending exteriorly along said channel in overlying engagement with said lips and bridging said slot, a reduced neck on the inner side of said bead extending through and substantially occupying said slot, an inner enlargement on said neck interiorly of said channel and engageable with said lips to retain said bead in position without other securement to said channel, and pressure responsive switch means extending longitudinally along and entirely within said bead and operative responsive to depression of said bead for stopping door movement on bead depression.

2. A pressure sensitive door edge construction according to claim 1, said neck being slidable in said slot for endwise inserting assembly and withdrawing disassembly of said unit with respect to said channel.

3. A pressure sensitive door edge construction comprising a rigid channel for extension along a door facing outwardly therefrom, inturned lips on said channel spaced apart to define therebetween a longitudinal slot communicating between the interior and exterior of said channel, a resiliently depressible bead extended exteriorly along said channel in overlying engagement with said lips and bridging said slot, a reduced neck on the inner side of said bead extending through and substantially occupying said slot, an inner enlargement on said neck interiorly of said channel and engageable with said lips to retain said channel in position without other securement to said channel, and pressure responsive switch means extending longitudinally along and within said bead and operative responsive to depression of said bead for stopping door movement on bead depression, said bead, neck, and inner enlargement comprising an integral unit fabricated of resilient flexible material, said inner enlargement and neck being provided with a longitudinal split extending between the interiors of said bead and channel for passage laterally through said slit of said switch means into said bead.

4. A pressure sensitive door edge construction comprising a rigid channel for extension along a door facing outwardly therefrom, inturned lips on said channel spaced apart to define therebetween a longitudinal slot communicating between the interior and exterior of said channel, a resiliently depressible bead extending exteriorly along said channel in overlying engagement with said lips and bridging said slot, a reduced neck on the inner side of said bead extending through and substantially occupying said slot, an inner enlargement on said neck interiorly of said channel and engageable with said lips to retain said bead in position without other securement to said channel, and pressure responsive switch means operatively connected to said bead and responsive to depression of said bead for stopping door movement on bead depression, said neck being formed with a through opening communicating between the interiors of said bead and said inner enlargement, said switch means extending longitudinally along and within said inner enlargement, and pressure transmission means extending from the interior of said bead spacedly through said opening to said switch means for transmitting pressure from said bead to said switch means.

5. A pressure sensitive door edge construction according to claim 4, said bead, neck, inner enlargement and pressure transmission means comprising an integral unit fabricated of resiliently flexible material.

6. A pressure sensitive door edge construction according to claim 5, said through opening being longitudinally elongate, and said pressure transmission means comprising a tongue integral with said bead extending spacedly through said through opening for bearing engagement with said switch means.

7. A pressure sensitive door edge construction according to claim 6, said integral unit being interiorly hollow and hermetically sealed.

8. A pressure sensitive door edge construction according to claim 4, said pressure transmission means comprising a tongue operatively connected to said bead for depression therewith and extending spacedly through said through opening for bearing engagement with said switch means.

9. A pressure sensitive door edge construction according to claim 8, in combination with an enlargement on said tongue remote from said switch means, and shoulder means interiorly of said bead in retaining engagement with said enlargement to retract the latter away from said switch means on return of said bead from said depression.

10. A pressure sensitive door edge construction according to claim 9, said enlargement comprising a cross member in retained engagement with said shoulder means.

* * * * *